(12) United States Patent
Inoue et al.

(10) Patent No.: US 11,292,366 B2
(45) Date of Patent: Apr. 5, 2022

(54) SLIDE DEVICE

(71) Applicant: DELTA KOGYO CO., LTD., Hiroshima (JP)

(72) Inventors: Katsuhiro Inoue, Hiroshima (JP); Hiroshi Danjo, Hiroshima (JP)

(73) Assignee: DELTA KOGYO CO., LTD., Hiroshima (JP)

( * ) Notice: Subject to any disclaimer, the term of this patent is extended or adjusted under 35 U.S.C. 154(b) by 0 days.

(21) Appl. No.: 17/264,065

(22) PCT Filed: Jul. 16, 2019

(86) PCT No.: PCT/JP2019/027892
§ 371 (c)(1),
(2) Date: Jan. 28, 2021

(87) PCT Pub. No.: WO2020/031624
PCT Pub. Date: Feb. 13, 2020

(65) Prior Publication Data
US 2021/0323448 A1    Oct. 21, 2021

(30) Foreign Application Priority Data

Aug. 8, 2018   (JP) .............................. JP2018-149724

(51) Int. Cl.
*B60N 2/08*    (2006.01)
(52) U.S. Cl.
CPC ........... *B60N 2/085* (2013.01); *B60N 2/0818* (2013.01)

(58) Field of Classification Search
CPC .... B60N 2/085; B60N 2/0812; B60N 2/0818; B60N 2/0831; B60N 2/0837;
(Continued)

(56) References Cited

U.S. PATENT DOCUMENTS 4,828,322 A * 5/1989 Walk .................... B60N 2/2252
                                                       297/362
4,916,962 A * 4/1990 Tsutsumi ............. B60N 2/2252
                                                       297/362
(Continued)

FOREIGN PATENT DOCUMENTS

GB          468462 A  *  7/1937  ........... B60N 2/0868
JP    2004-051082 A      2/2004
(Continued)

*Primary Examiner* — Jonathan Liu
*Assistant Examiner* — Guang H Guan
(74) *Attorney, Agent, or Firm* — Studebaker & Brackett PC

(57) ABSTRACT

Provided is a slide device that can prevent rattling of a seat with a simple structure. A slide device includes a lock mechanism for fixing an upper rail to a lower rail. The lock mechanism includes a shaft attached to the upper rail, a lock tooth swingably supported by the shaft, and a wave washer that presses the lock tooth in an axial direction of the shaft. An outer circumferential face of the shaft has an outer tapered face slanted so that the shaft becomes thinner along a direction from a proximal end portion toward a distal end portion. An inner circumferential face of the shaft hole of the lock tooth has an inner tapered face having a slant angle that allows face-to-face contact with the outer tapered face. The wave washer presses the lock tooth in a direction in which the inner tapered face is pressed against the outer tapered face to make face-to-face contact.

19 Claims, 11 Drawing Sheets

(58) Field of Classification Search
CPC .. B60N 2/0843; B60N 2/0856; B60N 2/0881; B60N 2/0887
USPC ........................................ 248/424, 429, 430
See application file for complete search history.

(56) References Cited

U.S. PATENT DOCUMENTS

| | | | | |
|---|---|---|---|---|
| 4,943,116 A * | 7/1990 | Ohwada | ............... | B60N 2/2252 297/362 |
| 5,961,088 A * | 10/1999 | Chabanne | .......... | B60N 2/01525 248/429 |
| 6,767,063 B1 * | 7/2004 | Abdella | ................ | B60N 2/085 297/344.11 |
| 7,293,752 B2 * | 11/2007 | McCulloch | .......... | B60N 2/0705 248/424 |
| 7,328,877 B2 * | 2/2008 | Yamada | ............... | B60N 2/0705 248/430 |
| 7,798,462 B2 * | 9/2010 | Yoshida | ............... | B60N 2/0818 248/429 |
| 8,517,328 B2 * | 8/2013 | Wieclawski | ........... | B60N 2/123 248/429 |
| 9,371,013 B2 * | 6/2016 | Nakamura | ........... | B60N 2/0818 |
| 10,131,251 B2 * | 11/2018 | Harvey | ................. | B60N 2/085 |
| 2021/0323448 A1 * | 10/2021 | Inoue | ................... | B60N 2/0722 |

FOREIGN PATENT DOCUMENTS

| | | | | |
|---|---|---|---|---|
| JP | 2018-094947 A | | 6/2018 | |
| WO | WO-2014125507 A2 * | | 8/2014 | ........... B60N 2/0705 |

* cited by examiner

SLIDE DEVICE

TECHNICAL FIELD

The present invention relates to a slide device that slidably supports a seat along a front-and-rear direction and locks the seat at a desired location regarding the front-and-rear direction.

BACKGROUND ART

Conventionally, a slide device that supports a seat along a front-and-rear direction and locks the seat at a desired location regarding the front-and-rear direction is widely used for a seat of a car or the like.

For example, the slide device has such a structure as described in Patent Literature 1. As illustrated in FIG. 10, the slide device includes a lower rail 51 fixed to a vehicle floor along a front-and-rear direction of a seat, and an upper rail 52 fixed to the seat and guided by the lower rail 51 to move along the front-and-rear direction. The lower rail 51 includes a plurality of teeth 53 provided along a longitudinal direction of the lower rail 51.

The slide device includes a slide lock mechanism 54 to lock the upper rail 52 at a desired position. The slide lock mechanism 54 includes a lock tooth 55, and an operating lever 56 that gives an operating force to the lock tooth 55.

The lock tooth 55 is attached to a first support shaft 57 provided on the upper rail 52 to extend in a lateral direction (direction normal to the plane of FIG. 10) so as to swing upward and downward. The lock tooth 55 includes a plate-like engagement piece 58 protruding in the lateral direction (direction normal to the plane of FIG. 10) from a lower end portion of a free end (right end in FIG. 10) of the lock tooth 55. The engagement piece 58 is provided with three catch holes 59 that can engage with a plurality of teeth 53 of the lower rail 51.

Resilience of a tension coil spring 60 constantly urges the lock tooth 55 in such a direction that causes the lock tooth 55 to swing upward. When the operating lever 56 is not receiving an operating force, the lock tooth 55 is kept at a locked position where the teeth 53 of the lower rail 51 are engaging with the catch holes 59 of the engagement piece 58. When the lock tooth 55 is at the locked position, the lock tooth 55 engaging with the teeth 53 disallows the upper rail 52 from moving along the front-and-rear direction.

Meanwhile, a protruding piece 61 protruding in the lateral direction (direction normal to the plane of FIG. 10) is provided at an upper end, above the first support shaft 57, of the lock tooth 55. The protruding piece 61 covers a portion of the operating lever 56 from above.

The operating lever 56 is swingably supported by a second support shaft 62 projecting in the lateral direction (direction normal to the plane of FIG. 10) from the lock tooth 55. A coil spring 63 attached to the second support shaft 62 urges the operating lever 56 via an arm 63a of the coil spring 63 in such a direction that causes the operating lever 56 to swing upward.

To cancel locking performed by the slide lock mechanism 54 configured as described above and illustrated in FIG. 10, the free end of the operating lever 56 (end portion in the left side in the sheet on which FIG. 10 is drawn, that is, an end portion opposite the second support shaft 62) is pulled up. The operating lever 56 thereby swings upward about the second support shaft 62. In this motion, the operating lever 56 pushes up the protruding piece 61 of the lock tooth 55 via a cushioning pad 64. The lock tooth 55 thereby swings downward about the first support shaft 57 against a tensional force of the tension coil spring 60. As a result, the catch holes 59 of the engagement piece 58 provided on the free end of the lock tooth 55 move to be lower than the teeth 53 of the lower rail 51, thereby disengaging the lock tooth 55 from the lower rail 51 to allow the upper rail 52 and the seat connected to the upper rail 52 to move along the front-and-rear direction.

By stopping the operation of pulling up the operating lever 56 when the seat has moved to the desired position regarding the front-and-rear direction, the lock tooth 55 swings upward by the resilience of the tension coil spring 60 and the catch holes 59 of the engagement piece 58 of the lock tooth 55 engage with the teeth 53 of the lower rail 51 to lock the upper rail 52 and the seat at the position, thereby disallowing the upper rail 52 and the seat from moving along the front-and-rear direction.

In the slide device described in Patent Literature 1, the lock tooth 55 swings upward and downward to cause engagement with and disengagement from the teeth 53 of the lower rail 51. The lock tooth 55 is swingably supported by the first support shaft 57 projecting in the lateral direction from the upper rail 52. It is understood that the first support shaft 57 has a shape of a round bar with a circular cross-section.

To swingably assemble the lock tooth 55 to the first support shaft 57 having a shape of a round bar in such a structure, there should be a gap (play) between a through hole (shaft hole) 56a provided in the lock tooth 55 and an outer circumferential face of the first support shaft 57. This gap causes rattling of the lock tooth 55 relative to the first support shaft 57 along the front-and-rear direction of the seat and an axial direction of the first support shaft 57 when the car is traveling, which may result in rattling of the seat. When the seat rattles, a relatively large load (80 N or greater) along the front-and-rear direction and proportional to the weight of the seat and the weight of the person sitting in the seat acts on a fitting portion having the gap between the shaft hole 56a of the lock tooth 55 and the first support shaft 57, which may cause deterioration and damage in the lock tooth 55 and the first support shaft 57 and become the cause of noises.

To prevent rattling of the lock tooth 55 in the conventional art, such a structure having a wedge-shaped engaging-part tightly fitting with an engaged-part needs to be employed, or a special spring mechanism for preventing rattling of the lock tooth 55 along both the front-and-rear direction and the axial direction needs to be provided. This disadvantageously makes the structure of the slide device complicated and increases the manufacturing cost.

CITATION LIST

Patent Literature

Patent Literature 1: JP 4247405 B2

SUMMARY OF INVENTION

The present invention has been made in view of the problem described above. An object of the present invention is to provide a slide device that can prevent rattling of a seat with a simple structure.

To solve the problem described above, a slide device according to the present invention is a slide device that slidably supports a seat along a front-and-rear direction and locks the seat at a desired position regarding the front-andrear direction, the slide device including a lower rail fixed to an installation face where the seat is set, an upper rail that has a portion fixed to the seat and is guided by the lower rail to move along the front-and-rear direction, and a lock mechanism for locking the upper rail to the lower rail, where the lower rail includes a plurality of engaged-parts provided along a longitudinal direction of the lower rail, the lock mechanism includes a shaft attached to the upper rail and extending in a width direction of the seat perpendicular to the front-and-rear direction, an engaging member that includes an engaging-part having a shape engageable with at least one of the plurality of engaged-parts of the lower rail, and a shaft hole to which the shaft is inserted, and is supported by the shaft so as to pivot about the shaft, and a press member that presses the engaging member in an axial direction of the shaft, an outer circumferential face of the shaft has an outer tapered face slanted so that the shaft becomes thinner along a direction from a proximal end portion toward a distal end portion, an inner circumferential face of the shaft hole of the engaging member has an inner tapered face having a slant angle that allows face-to-face contact with the outer tapered face, and the press member presses the engaging member in a direction in which the inner tapered face is pressed against the outer tapered face to make face-to-face contact.

In the present invention, a term "to lock" means to fix the seat or the upper rail not to move.

DESCRIPTION OF EMBODIMENT

Figure 1:
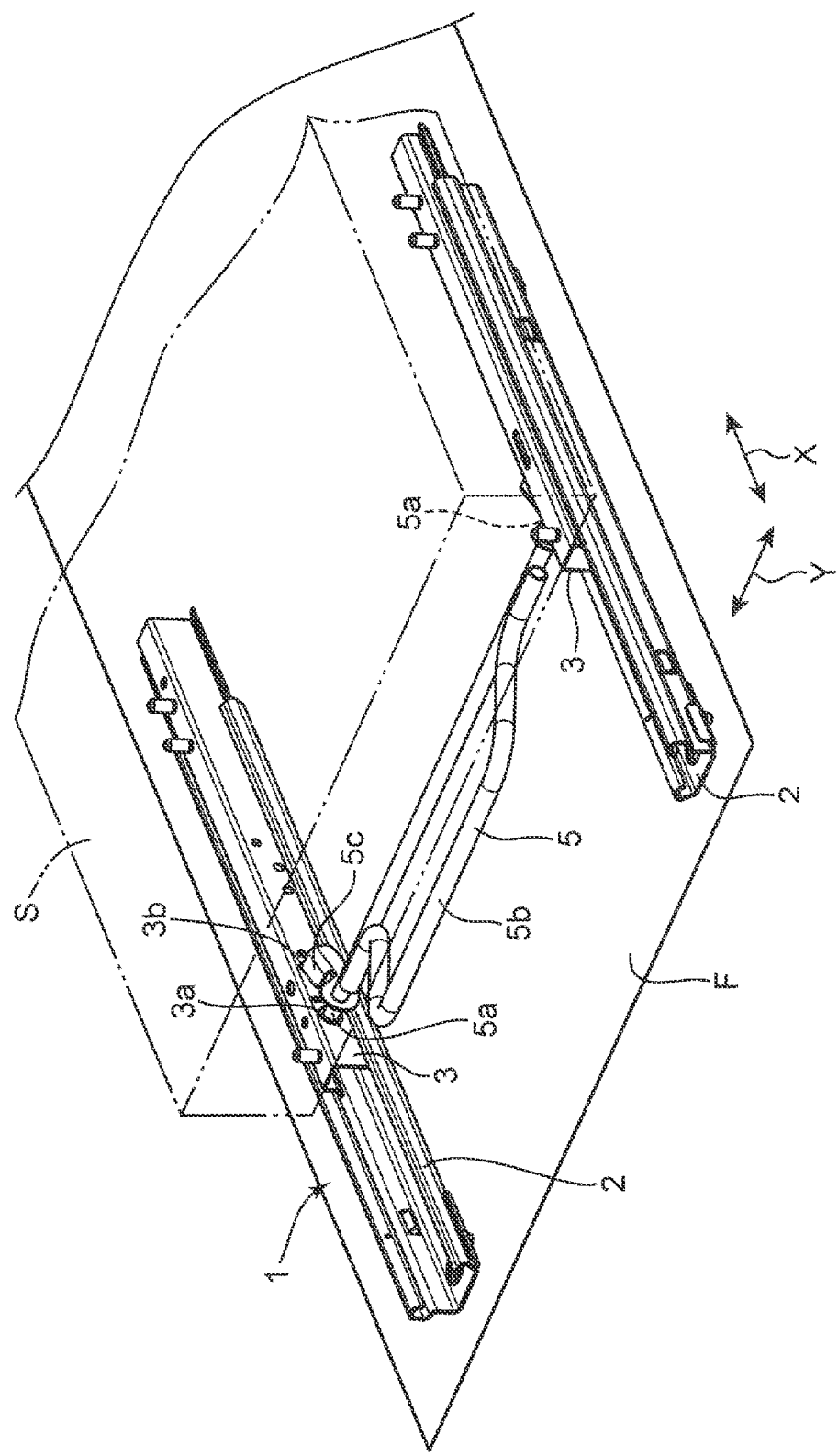
FIG. 1 is an overall perspective view illustrating a slide device according to an embodiment of the present invention.

One preferable embodiment of a slide device of the present invention will be described below with reference to the attached drawings.

As illustrated in FIGS. 1 to 5, a slide device 1 according to the embodiment is configured to support, for example, a seat S used as a vehicle seat to slidably move along a front-and-rear direction X of the seat S and lock the seat S at a desired position regarding the front-and-rear direction X.

Specifically, the slide device 1 includes a pair of lower rails 2, a pair of upper rails 3, a lock mechanism 4 provided in an inner side of the upper rails 3 to lock the upper rails 3 to disallow sliding, and an operating lever 5 that cancels locking performed by the lock mechanism 4.

A pair of lower rails 2 is fixed to a vehicle floor F, which is an installation face where the seat S is set, along the front-and-rear direction X to be separated from each other.

Figure 6:
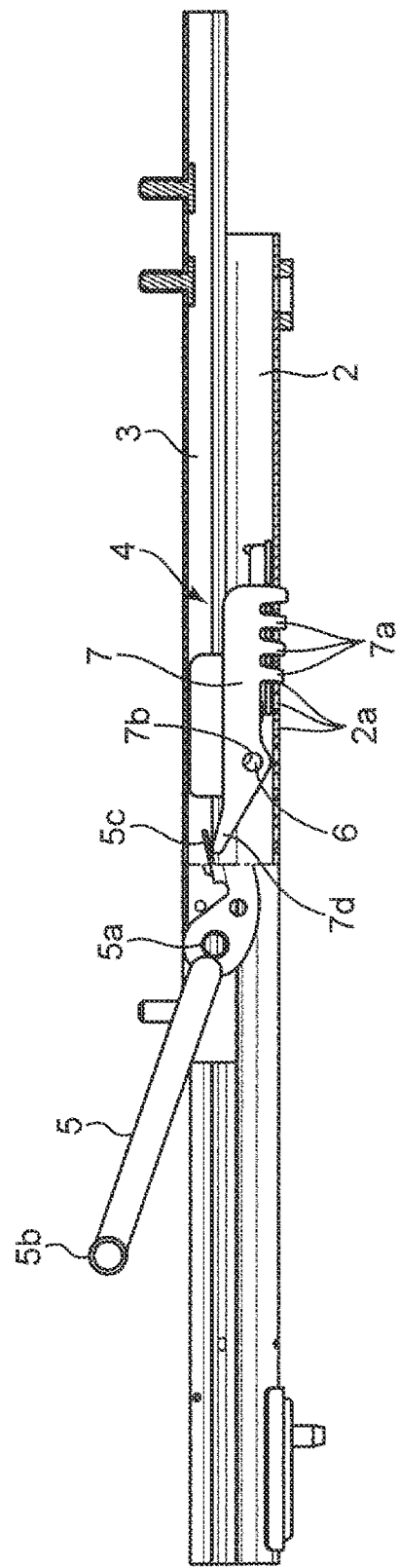
FIG. 6 is a cross-sectional explanatory view illustrating a vertical cross-section of the slide device in FIG. 1 in a locked state.
Figure 7:
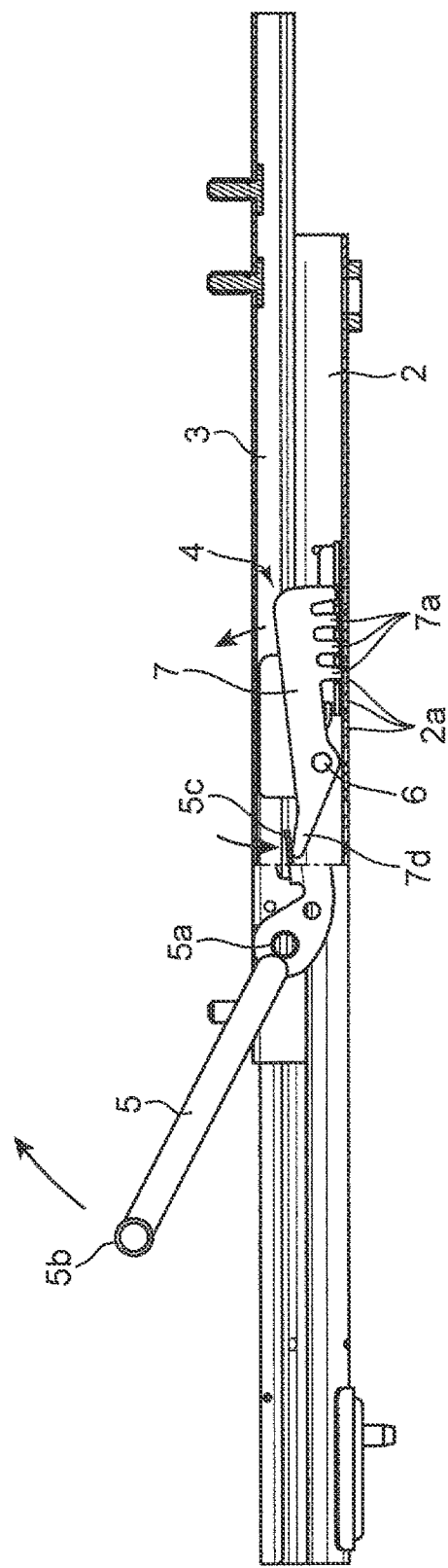
FIG. 7 is a cross-sectional explanatory view illustrating a vertical cross-section of the slide device in FIG. 1 in an unlocked state.

A plurality of engaging holes 2a (engaged-part) illustrated in FIGS. 6 and 7 is provided in a bottom face of each of the lower rails 2. Many engaging holes 2a are provided along a longitudinal direction (that is, the front-and-rear direction X) of the lower rail 2 at a constant interval. Two projecting portions 2b (see FIG. 2) separated from each other along the front-and-rear direction X are provided on a side wall of the lower rail 2 to determine a range within which the upper rail 3 can move.

Figure 2:
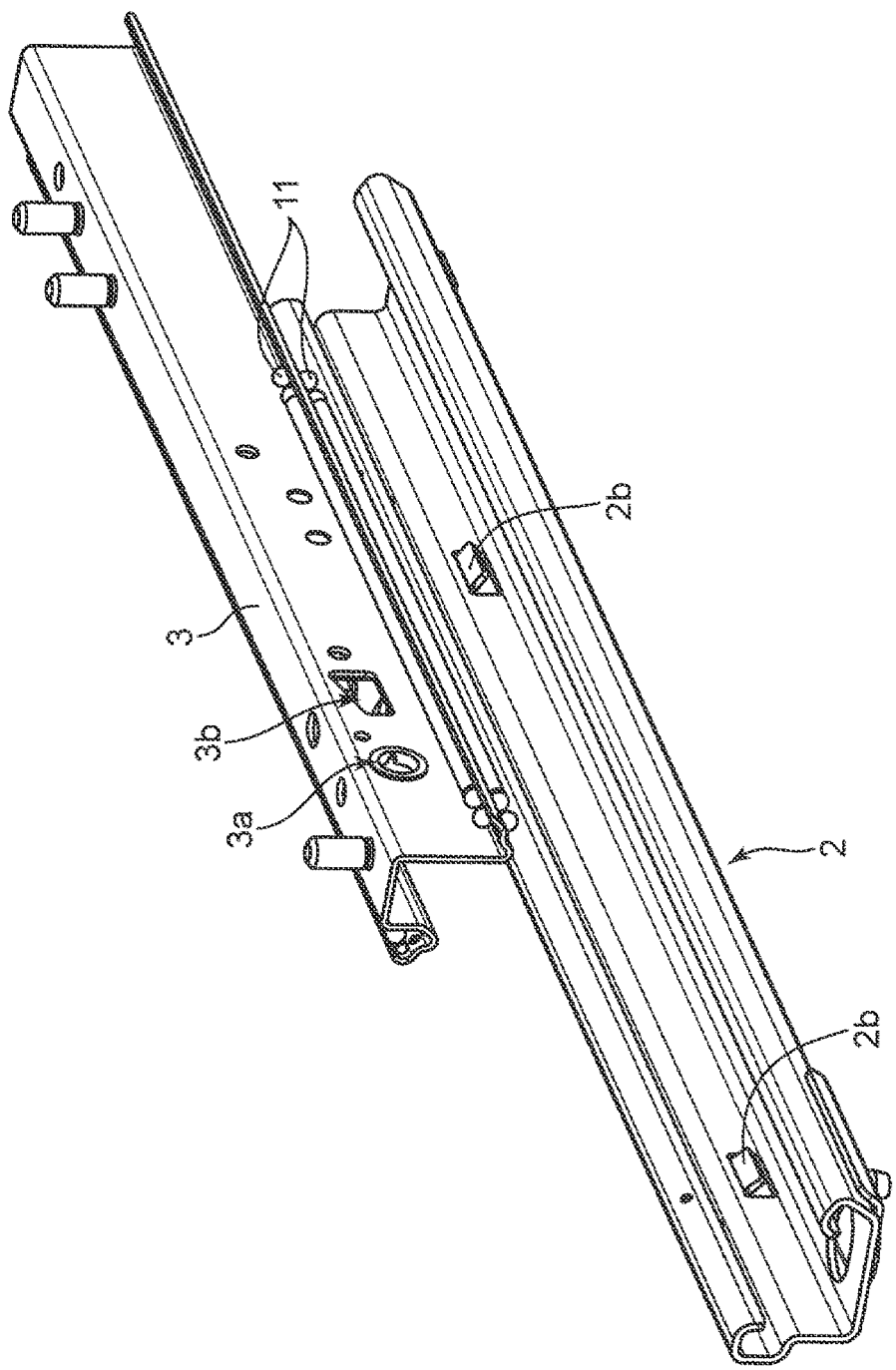
FIG. 2 is an exploded perspective view of an upper rail and a lower rail in FIG. 1.
Figure 5:
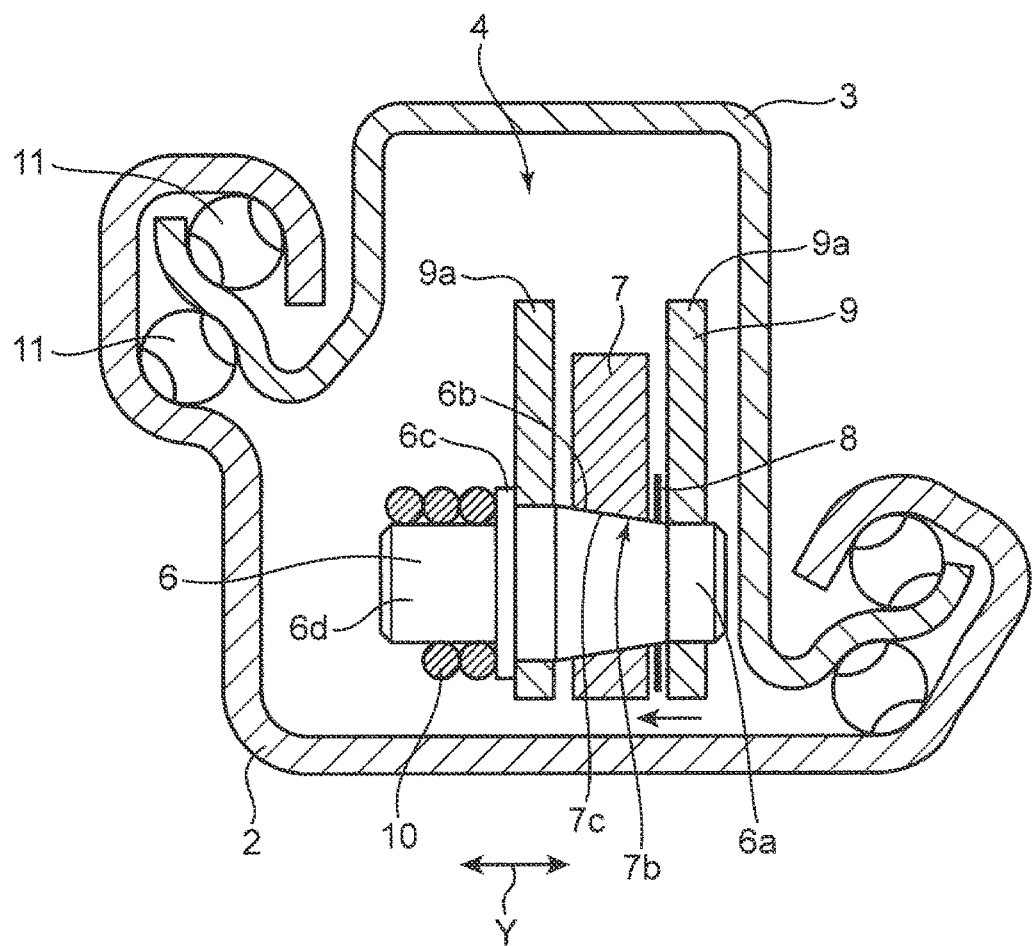
FIG. 5 is a cross-sectional explanatory view illustrating a transverse cross-section of an inner structure of a portion surrounded by the upper rail and the lower rail in FIG. 1.

The upper rail 3 includes a portion fixed to the seat S (for example, a stud bolt protruding upward). The upper rail 3 is guided by the lower rail 2 to move along the front-and-rear direction X. In the embodiment, as illustrated in FIGS. 2 and 5, both edge portions of the upper rail 3 are supported by a plurality of balls 11 so as to slide along the front-and-rear direction X relative to edge portions of the lower rail 2. A rolling unit other than the balls 11 or a different kind of supporting unit may be used to support the upper rail 3 on the lower rail 2 so as to move along the front-and-rear direction X.

An attachment hole 3a and an aperture 3b illustrated in FIGS. 1 to 4 are provided in the side wall of the upper rail 3 to be adjacent to each other along the front-and-rear direction X.

Figure 3:
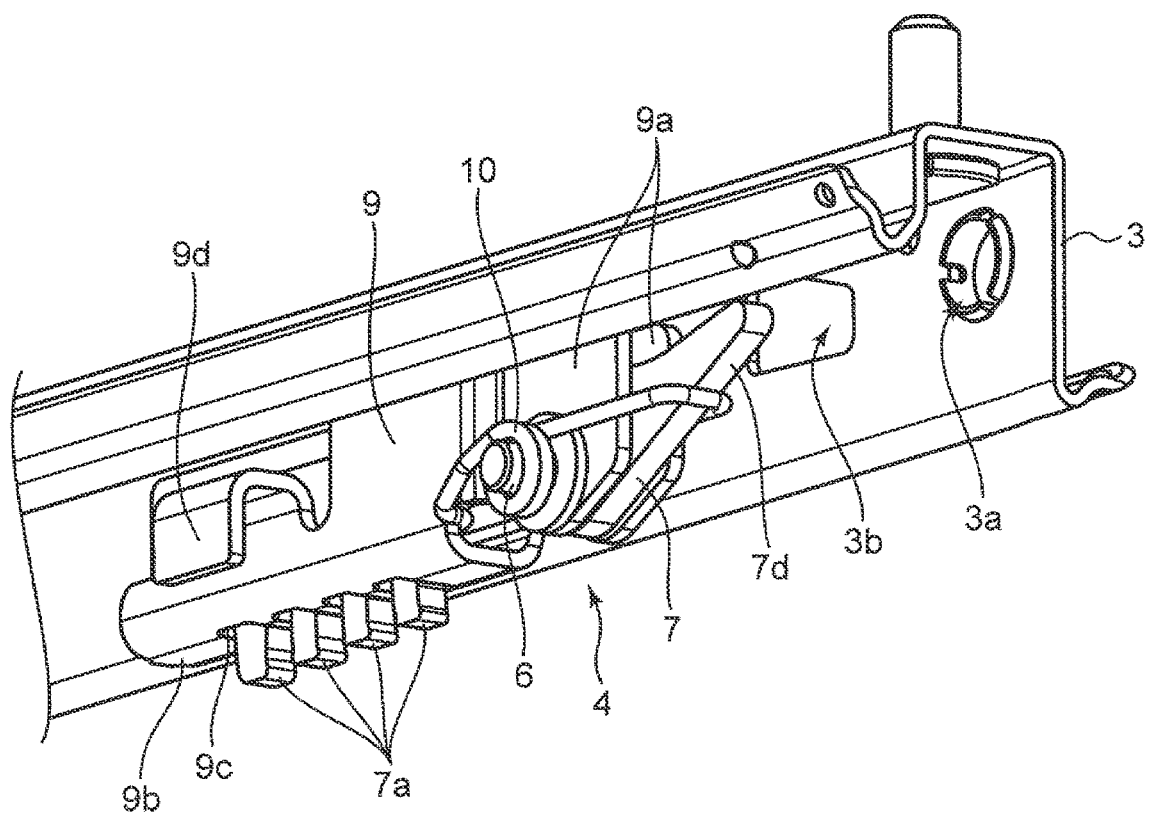
FIG. 3 is an enlarged perspective view of a lock mechanism provided in an inner side of the upper rail in FIG. 1.
Figure 4:
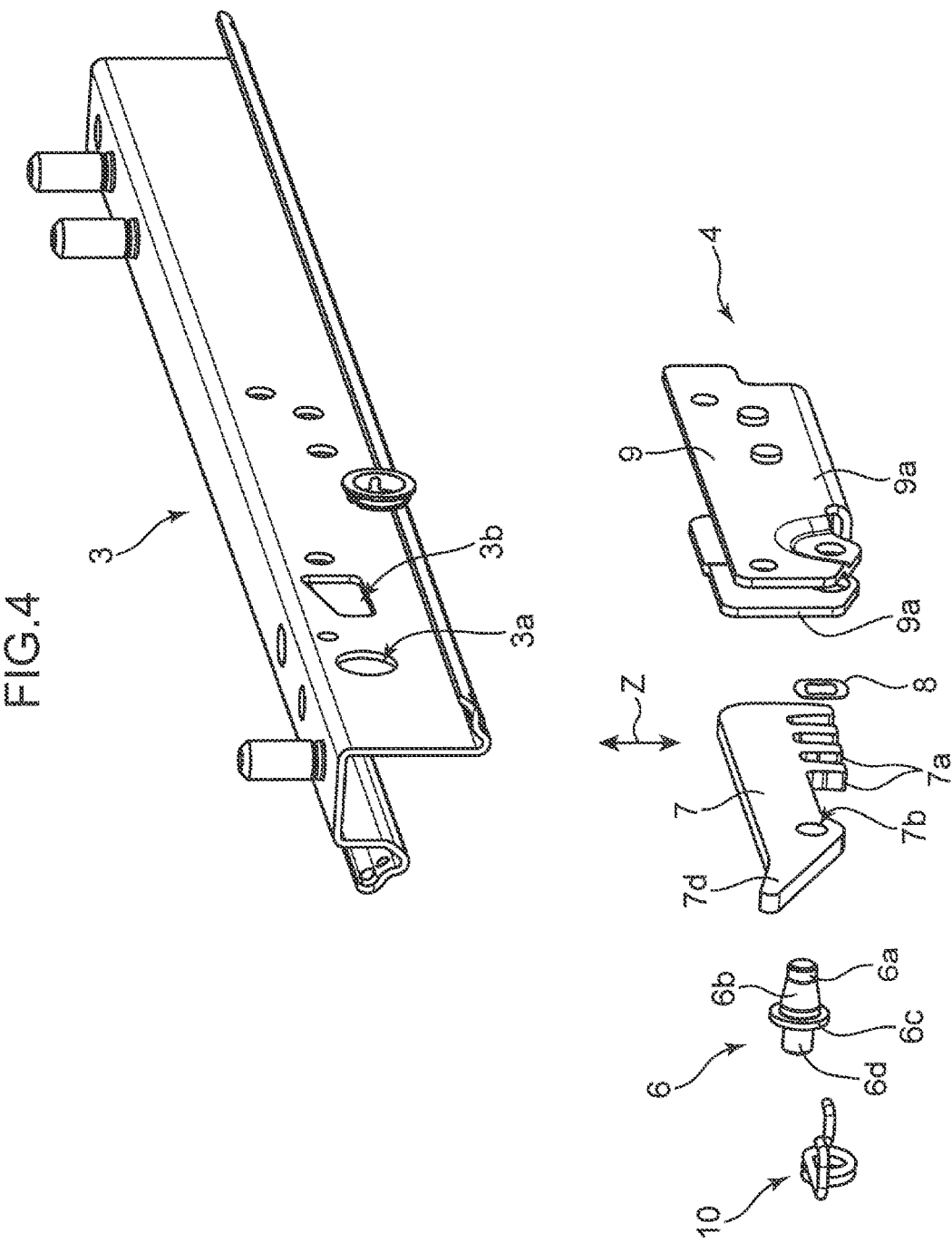
FIG. 4 is an exploded perspective view of the lock mechanism in FIG. 3.

As illustrated in FIGS. 3 to 5, the lock mechanism 4 is configured to lock the upper rail 3 to the lower rail 2. Specifically, the lock mechanism 4 includes a shaft 6, a lock tooth 7 (engaging member) swingably supported by the shaft 6, a wave washer 8 (press member) attached to the shaft 6, a holder 9 that holds the shaft 6, and a lock spring 10 (rotationally urging member).

The shaft 6 is attached to the upper rail 3 to extend in a width direction Y of the seat S perpendicular to the front-and-rear direction X. In the embodiment, the shaft 6 is attached to the upper rail 3 via the holder 9.

The holder 9 interconnects the shaft 6 and the upper rail 3 to fix the shaft 6 to the upper rail 3.

Specifically, the holder 9 includes a pair of opposing walls 9a separated from each other along the direction (width direction Y) perpendicular to the front-and-rear direction X, and a bottom wall 9b (see FIG. 3) interconnecting lower ends of the opposing walls 9a.

The shaft 6 is positioned so as an outer tapered face 6b, which will be described later, to be positioned between the pair of opposing walls 9a and fixed to each of the pair of opposing walls 9a by welding, for example. One of the pair of opposing walls 9a is fixed to an inner wall of the upper rail 3 by screwing, for example.

The lock tooth 7 is a thin, long, plate-like member. A plurality of teeth 7a is provided on a lower end of one of end portions of the lock tooth 7 to protrude downward. A plurality of teeth 7a serves as an engaging-part that can engage with at least one of a plurality of engaging holes 2a of the lower rail 2. At least one tooth 7a can serve as the engaging-part that engages with the engaging hole 2a of the lower rail 2.

The lock tooth 7 includes a shaft hole 7b in which the shaft 6 is inserted. The lock tooth 7 is disposed in a space between the pair of opposing walls 9a of the holder 9, and supported by the shaft 6 inserted in the shaft hole 7b so as to swing about the shaft 6.

The teeth 7a of the lock tooth 7 can protrude below the holder 9 through the through hole 9c provided in the bottom wall 9b of the holder 9.

The lock tooth 7 includes a receiving portion 7d that is provided in the opposite side of the portion where the teeth 7a are provided, in relation to the shaft hole 7b, and receives an operating force to swing the lock tooth 7 in such a direction that disengages the teeth 7a from the engaging holes 2a.

The shaft 6 includes a distal end portion 6a and a proximal end portion 6d. An outer circumferential face of the shaft 6 has an outer tapered face 6b slanted so that the shaft 6 becomes thinner along a direction from the proximal end portion 6d toward the distal end portion 6a.

Corresponding to the outer tapered face 6b, an inner circumferential face of the shaft hole 7b of the lock tooth 7 has an inner tapered face 7c having a slant angle that allows face-to-face contact with the outer tapered face 6b.

The inner tapered face 7c has a slant angle that allows face-to-face contact with the outer tapered face 6b (substantially the same slant angle as a slant angle of the outer tapered face 6b).

Figure 8:
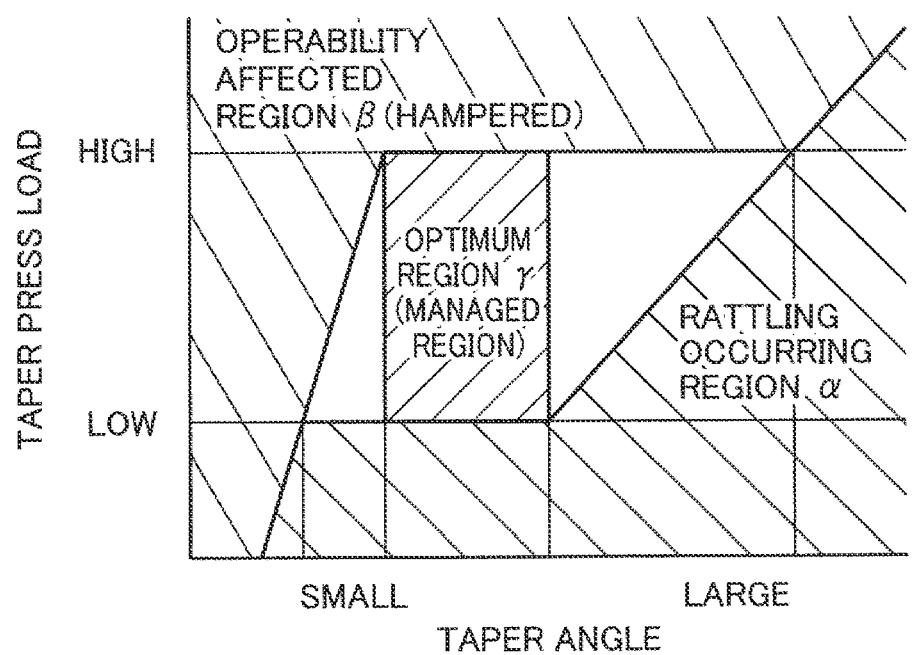
FIG. 8 is a chart for explaining an optimum region for a lock operation, the region being derived from a taper angle and a taper press-load of the slide device according to the embodiment of the present invention.

With reference to FIG. 8, an optimum region for a lock operation will be discussed, where the region is derived from a taper angle and a taper press-load of the slide device according to the embodiment of the present invention (the embodiment in FIGS. 1 to 7).

The taper angles are slant angles of the outer tapered face 6b and the inner tapered face 7c. The taper press-load is a load by which the inner tapered face 7c is pressed against the outer tapered face 6b. FIG. 8 illustrates the press-load along the front-and-rear direction (direction in which the shaft 6 in FIG. 5 extends, that is, the width direction Y).

As illustrated in FIG. 8, when the taper press-load is too small (too low), the inner tapered face 7c cannot sufficiently be pressed against the outer tapered face 6b and rattling occurs between the lock tooth 7 and the shaft 6 regardless of the degree of the taper angle (see a rattling-occurring region α in FIG. 8).

Meanwhile, when the taper press-load is too large (high), a high taper face pressure degrades operability of swinging the lock tooth 7, and an operation cannot be made smoothly (see an operability affected (hampered) region β in FIG. 8). The "hampered" means the movement of the lock tooth 7 being degraded or responsiveness of the lock tooth 7 receiving the operating force being degraded.

When the taper angle is too large, the force that holds the tapered faces together becomes low and the lock tooth 7 can move easily to cause rattling (see the rattling-occurring region α in FIG. 8).

Meanwhile, when the taper angle is too small, a high face pressure hinders a smooth operation (see the operability affected (hampered) region β in FIG. 8).

Thus, the taper angle and the taper press-load are to be set so as not to be in the rattling-occurring region α nor the operability affected (hampered) region β. Specifically, the taper angle and the taper press-load are to be set in a trapezoid region surrounded by the region α and the region β. More preferably, the taper angle and the taper press-load can easily be controlled (managed) when set within a range of an optimum region γ (managed region).

The taper angle is set as described above. For example, it is preferable that the taper angles, that is, the slant angles of the outer tapered face 6b and the inner tapered face 7c, are set to about 10 to 15 degrees to an axial center of the shaft 6.

With each of the slant angles of the outer tapered face 6b and the inner tapered face 7c being 10 to 15 degrees, the increase in a rotational resistance against swinging of the lock tooth 7 can be suppressed and at the same time rattling of the lock tooth 7 can be prevented. When the slant angles of the tapered faces 6b and 7c are smaller than 10 degrees, the shaft 6 makes a tight fit in the lock tooth 7 and the rotational resistance against swinging of the lock tooth 7 disadvantageously increases, whereas when the slant angles are larger than 15 degrees, the lock tooth 7 may easily move in such a direction that the lock tooth 7 comes off the shaft 6, thereby disadvantageously causing a rattling feeling. Thus, the angle of about 10 to 15 degrees is preferable.

The lock tooth 7 is disposed between a pair of opposing walls 9a and swingably supported by the shaft 6 with the outer tapered face 6b and the inner tapered face 7c in face-to-face contact with each other.

The wave washer 8 is an annular member surrounding the entire circumference of the shaft 6. Specifically, the wave washer 8 is a thin, metal ring made of a stainless steel, for example, and curved in a waveform in the width direction. The wave washer 8 functions to press the lock tooth 7 in the axial direction (width direction Y in FIG. 5) of the shaft 6.

The wave washer 8 disposed between a pair of opposing walls 9a of the holder 9 is sandwiched between the lock tooth 7 and the opposing wall 9a to which the distal end portion 6a of the shaft 6 is fixed. Thus, the wave washer 8 presses the lock tooth 7 in such a direction that the inner tapered face 7c of the lock tooth 7 is pressed against the outer tapered face 6b of the shaft 6 to make face-to-face contact.

The lock spring 10 is a coil spring that gives the lock tooth 7 a rotationally urging force in such a direction that causes the teeth 7a to engage with the engaging holes 2a. A coil portion of the lock spring 10 is hooked on the proximal end portion 6d of the shaft 6. A flange 6c restricts the coil portion from moving in the axial direction of the shaft 6. One of end portions of the lock spring 10 contacts the holder 9 from below to restrict rotation, and the other end portion contacts the receiving portion 7d of the lock tooth 7 from below to give a rotationally urging force to push up the receiving portion 7d. The lock spring 10 can give the rotationally urging force to the lock tooth 7 in such a direction that causes the teeth 7a to engage with the engaging holes 2a (clockwise direction about the shaft 6 in FIG. 6).

The operating lever 5 is disposed to be below a forward end portion of the seat S and extends in the width direction Y. The operating lever 5 is swingably supported at both end portions 5a on a pair of upper rails 3. Each of the end portions 5a are pivotally supported by the attachment hole 3a (see FIGS. 1 to 4) in the side wall of the upper rail 3.

As illustrated in FIG. 1, the operating lever 5 includes a handle 5b to which the operating force that pushes up the operating lever 5 is input, and a press portion 5c that transfers the operating force to the receiving portion 7d of the lock tooth 7 to press down the receiving portion 7d from above.

In the slide device 1 configured as described above in a state where the position of the upper rail 3 is locked by the lock mechanism 4 as illustrated in FIG. 6, the lock tooth 7 is receiving the rotationally urging force from the lock spring 10 (see FIGS. 3 to 5) in a direction to push up the receiving portion 7d, that is, in such a direction that causes the teeth 7a of the lock tooth 7 to engage with the engaging holes 2a of the lower rail 2 (clockwise direction in FIG. 6). This keeps the teeth 7a of the lock tooth 7 engaged with the engaging holes 2a of the lower rail 2, disallowing the upper rail 3 and the seat S fixed to the upper rail 3 from moving along the front-and-rear direction X.

Meanwhile, as illustrated in FIG. 7, the handle 5b of the operating lever 5 in the front side (left side in FIG. 7) of the seat S is pulled up to cancel locking performed by the lock mechanism 4. As illustrated in FIGS. 1 and 7, the operating lever 5 thereby swings upward about both the end portions 5a supported by the attachment holes 3a in a pair of upper rails 3. In this motion, the press portion 5c of the operating lever 5 penetrates the aperture 3b (see FIGS. 1 to 4) in the upper rail 3 and pushes down the receiving portion 7d of the lock tooth 7 inside the upper rail 3. The lock tooth 7 thereby swings, against the rotationally urging force given by the lock spring 10, in such a direction (counterclockwise direction in FIG. 7) that causes the teeth 7a of the lock tooth 7 to disengage from the engaging holes 2a of the lower rail 2. As a result, the teeth 7a of the lock tooth 7 disengage from the engaging holes 2a of the lower rail 2 to allow the upper rail 3 and the seat S fixed to the upper rail 3 to move along the front-and-rear direction X.

The movable range of the upper rail 3 is determined as a range within which a side projection 9d of the holder 9 (see FIG. 3) can move between the two projecting portions 2b of the lower rail 2 (see FIG. 2).

When the seat S has moved along the front-and-rear direction X to a desired position, stopping the pull-up operation of the operating lever 5 causes the lock tooth 7 receiving the rotationally urging force given by the lock spring 10 to swing back again in the clockwise direction to return to the state where the teeth 7a of the lock tooth 7 are engaged with the engaging holes 2a of the lower rail 2 (the state in FIG. 6), and thereby the upper rail 3 and the seat S fixed to the upper rail 3 are locked at the desired position.

Features of Embodiment (1) In the slide device 1 of the embodiment, the lock mechanism 4 for locking the upper rail 3 to the lower rail 2 includes the shaft 6, the lock tooth 7, and the wave washer 8 as a press member. The outer circumferential face of the shaft 6 has the outer tapered face 6b slanted so that the shaft 6 becomes thinner along the direction from the proximal end portion 6d toward the distal end portion 6a. The inner circumferential face of the shaft hole 7b of the lock tooth 7 has the inner tapered face 7c having such a slant angle that allows face-to-face contact with the outer tapered face 6b. The wave washer 8 presses the lock tooth 7 in the axial direction of the shaft 6, more specifically, presses the lock tooth 7 in a direction in which the inner tapered face 7c is pressed against the outer tapered face 6b to make the face-to-face contact.

In the locked state of this structure where the lock mechanism 4 restricts the upper rail 3 from moving relative to the lower rail 2 as illustrated in FIG. 6, the pressing force given by the wave washer 8 to the lock tooth 7 keeps the face-to-face contact between the inner tapered face 7c of the shaft hole 7b of the lock tooth 7 and the outer tapered face 6b of the shaft 6 as illustrated in FIG. 5. Thus, the lock tooth 7 can eliminate rattling in the axial direction of the shaft 6 and the front-and-rear direction X of the seat S. Accordingly, the slide device 1 can prevent rattling of the seat S with a simple structure.

Moreover, the face-to-face contact between the inner tapered face 7c of the lock tooth 7 and the outer tapered face 6b of the shaft 6 suppresses wearing. This improves durability of the lock tooth 7 and the shaft 6 and can suppress chronological change in the operating load. The durability of the lock tooth 7 can further be improved by increasing the hardness of the lock tooth 7 by a treatment such as heat treatment.

By simplifying the structure of the slide device 1 to prevent rattling of the seat S as described above, the number of parts and work man-hour for assembling can be reduced, which makes it possible to reduce manufacturing cost. Furthermore, preventing rattling of the seat S by a simple structure makes it possible to improve functionality for users (for example, operability or maintenance friendliness).

When the lock tooth 7 is rotationally operated by the operating force given by the operating lever 5 to cancel locking as illustrated in FIG. 7, a force is produced to cause the inner tapered face 7c of the lock tooth 7 illustrated in FIG. 5 to push the outer tapered face 6b of the shaft 6. The inner tapered face 7c receives a reactive force from the outer tapered face 6b, and the reactive force causes the lock tooth 7 to shift in a direction toward the distal end portion 6a of the shaft 6, thereby increasing the gap between the shaft hole 7b of the lock tooth 7 and the shaft 6. As a result, frictional resistance that is produced between the lock tooth 7 and the shaft 6 when the lock tooth 7 is rotationally operated can be suppressed. Meanwhile, when the operating force is no longer given to the lock tooth 7 by the operating lever 5, the urging force of the wave washer 8 illustrated in FIG. 5 causes the lock tooth 7 to shift from the distal end portion 6a of the shaft 6 to the deeper side (toward the proximal end portion 6d) and the inner tapered face 7c thereby fits tightly on the outer tapered face 6b. Thus, the rattling between the inner tapered face 7c and the outer tapered face 6b regarding the front-and-rear direction X and the axial direction (width direction Y) can be eliminated.

By eliminating the rattling between the lock tooth 7 and the shaft 6 by a tight fit between the inner tapered face 7c and the outer tapered face 6b as described above, rattling along the front-and-rear direction X between the upper rail 3 and the lower rail 2 can be eliminated. Accordingly, the balls 11 for sliding the upper rail 3 need not have a spring property (elasticity) to eliminate rattling, and thus the overall rigidity of the slide device 1 improves.

Figure 9A:
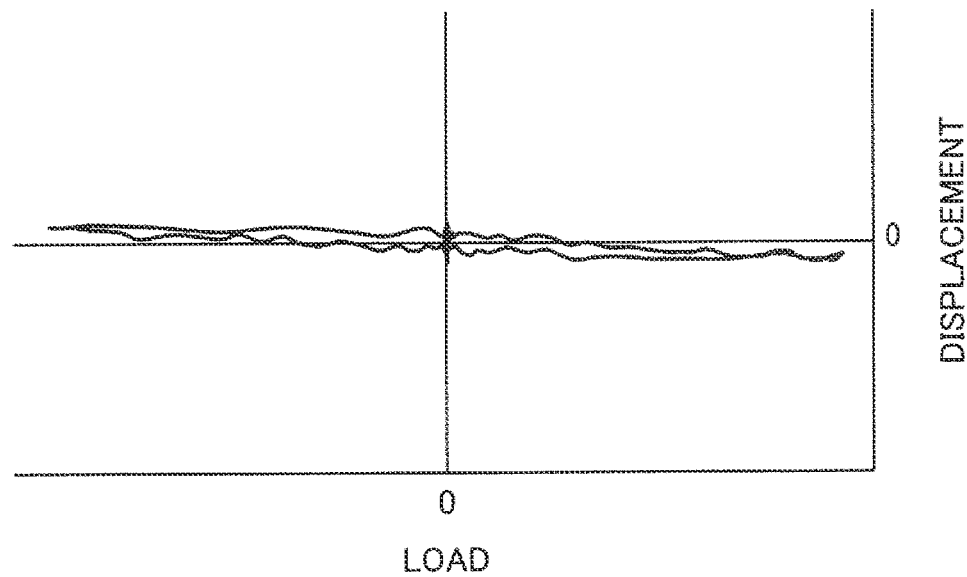
FIG. 9A is a chart illustrating displacement and load under rattling when the slide device according to the embodiment of the present invention is in the locked state.
Figure 9B:
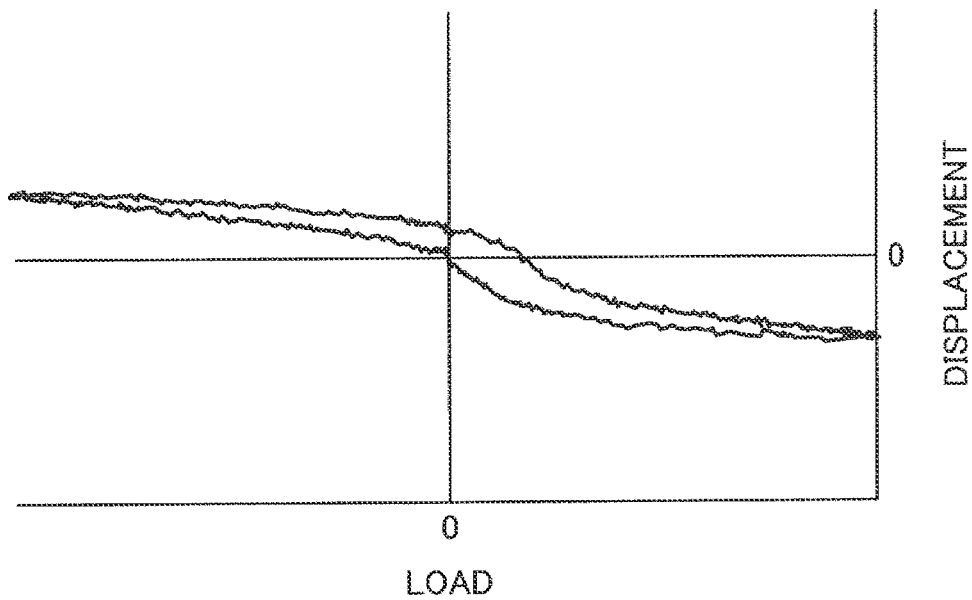
FIG. 9B is a chart given as a comparative example to the present invention, illustrating displacement and load under rattling when a combination of a shaft having no tapered face and a lock tooth is in the locked state.

Now, using charts in FIGS. 9A and 9B, the slide device 1 of the embodiment (that is, the structure including the inner tapered face 7c and the outer tapered face 6b) will be compared with a conventional slide device regarding the rattling along the front-and-rear direction.

The chart of displacement and load in FIG. 9B shows rattling along the front-and-rear direction in a conventional slide device in a locked state when a load given along the front-and-rear direction is increased and decreased. The conventional slide device has a structure with no tapered face on fitting faces between the shaft and the lock tooth, that is, a structure in which the shaft is a round bar and a shaft hole in the lock tooth is a straight hole (circular hole). Since a gap is necessary between the shaft and the shaft hole in the lock tooth for fitting, rattling along the front-and-rear direction cannot be absorbed. It can be understood from the chart in FIG. 9B that the displacement corresponding to the load is large. Moreover, there are large variation in the displacement and the load under the increased and decreased loading and an inflection point (steep curved portion). With such an inflection point, a person sitting in the seat feels rattling.

Meanwhile, the chart of displacement and load in FIG. 9A shows rattling along the front-and-rear direction in the slide device 1 of the embodiment in a locked state when a load given along the front-and-rear direction is increased and decreased. The slide device of the embodiment effectively absorbs the rattling along the front-and-rear direction by the tight fit between the outer tapered face 6b of the shaft 6 and the inner tapered face 7c of the lock tooth 7 with no gap between the shaft 6 and the shaft hole 7b of the lock tooth 7. It can be understood from the behavior in the chart in FIG. 9A that the displacement corresponding to the load is small. Moreover, the variation in displacement and load under the increased and decreased loading is small and there exists no inflection point. As a result, the slide device 1 of the embodiment does not cause a person sitting in the seat to feel rattling and therefore provides comfortable feeling while driving.

(2) Furthermore, in the slide device 1 of the embodiment, the lock mechanism 4 includes a holder 9 that interconnects the shaft 6 and the upper rail 3 to fix the shaft 6 to the upper rail 3. In this configuration, the shaft 6 is fixed to the upper rail 3 via the holder 9, so that the shaft 6 can easily be fixed at an arbitrary position on the upper rail 3 and the workability of attaching the shaft 6 improves.

(3) Furthermore, in the slide device 1 of the embodiment, the holder 9 includes a pair of opposing walls 9a separated from each other along the direction (width direction Y) perpendicular to the front-and-rear direction X. The shaft 6 is positioned so that the outer tapered face 6b is positioned between a plurality of opposing walls 9a and fixed to each of a plurality of opposing walls 9a. The lock tooth 7 is disposed between a pair of opposing walls 9a and swingably supported by the shaft 6 with the outer tapered face 6b and the inner tapered face 7c in face-to-face contact with each other.

In this configuration, the shaft 6 is fixed to each of a pair of opposing walls 9a of the holder 9, so that the shaft 6 can stably be fixed to the holder 9. Moreover, the lock tooth 7 is pivotally supported between a pair of opposing walls 9a of the holder 9 by the shaft 6, which reliably avoids the lock tooth 7 coming off the shaft 6 even in a state that the outer tapered face 6b and the inner tapered face 7c are in face-to-face contact with each other. Furthermore, in this configuration, a pair of opposing walls 9a of the holder 9 can reliably protect contact portions of the outer tapered face 6b and the inner tapered face 7c from depositing of or contacting foreign objects, and thus deterioration in the tapered faces 6b and 7c can be suppressed.

(4) Furthermore, the slide device 1 of the embodiment employs the wave washer 8 as a press member that presses the lock tooth 7 in the axial direction. Since the wave washer 8 is an annular member surrounding the entire circumference of the shaft 6, the wave washer 8 with the shaft 6 inserted therein will not come off the shaft 6. Moreover, the wave washer 8 can press the lock tooth 7 in the axial direction evenly along the entire outer circumference of the shaft 6.

In particular, in a structure where the lock tooth 7 is swingably supported by the shaft 6 between a pair of opposing walls 9a of the holder 9 as illustrated in FIG. 5, the wave washer 8 made of an annular member is disposed between a pair of opposing walls 9a and sandwiched between the lock tooth 7 and the opposing wall 9a to which the distal end portion 6a of the shaft 6 is fixed. This enables the wave washer 8 to reliably press the lock tooth 7 in the axial direction (width direction Y) without coming off the shaft 6.

(5) In the slide device 1 of the embodiment, the lock mechanism 4 includes the lock spring 10 that gives the lock tooth 7 a rotationally urging force in such a direction that causes the teeth 7a to engage with the engaging holes 2a.

This configuration, in which the lock spring 10 gives the lock tooth 7 the rotationally urging force in such a direction that causes the teeth 7a to engage with the engaging holes 2a, so that the lock tooth 7 can prevent the teeth 7a of the lock tooth 7 from disengaging from the engaging holes 2a of the lower rail 2 by, for example, vibration transferred from a floor F (installation face) to the slide device 1 at a timing unexpected by a user.

(6) In the slide device 1 of the embodiment, the lock tooth 7 includes a receiving portion 7d that is provided in the opposite side of the portion where the teeth 7a is provided, in relation to the shaft hole 7b, and receives an operating force to swing the lock tooth 7 in such a direction that causes the teeth 7a to disengage from the engaging holes 2a. The slide device 1 includes the operating lever 5 that is swingably supported on the upper rail 3 and externally gives an operating force to the receiving portion 7d.

With this configuration, the operating force can be given to the receiving portion 7d of the lock tooth 7 via the operating lever 5, and an operation for swinging the lock tooth 7 in such a direction that causes the teeth 7a of the lock tooth 7 to disengage from the engaging holes 2a can be made easily and reliably.

Comparative Explanation of Embodiment and Slide Device Disclosed in Patent Literature 1

Figure 10:
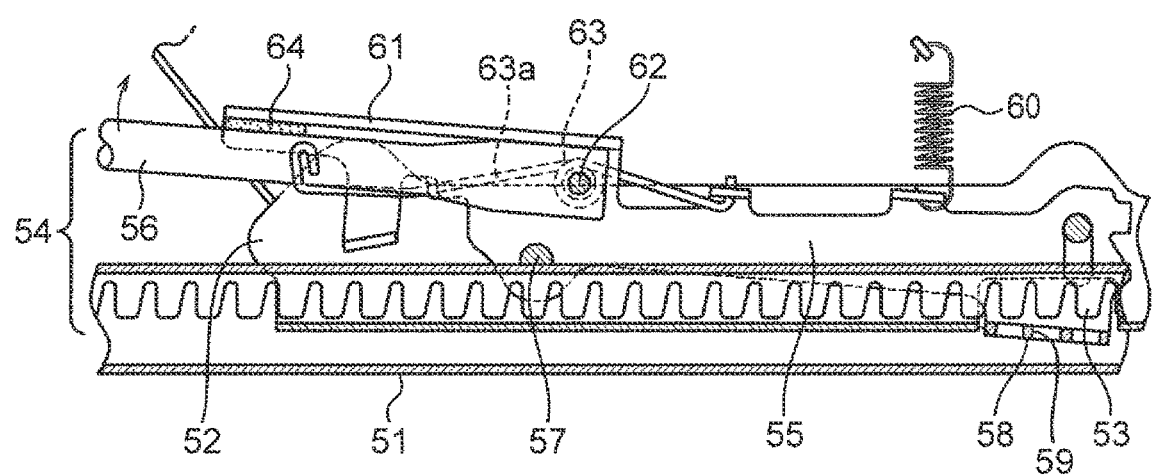
FIG. 10 is a cross-sectional view illustrating an internal structure of a conventional slide device.
Figure 11:
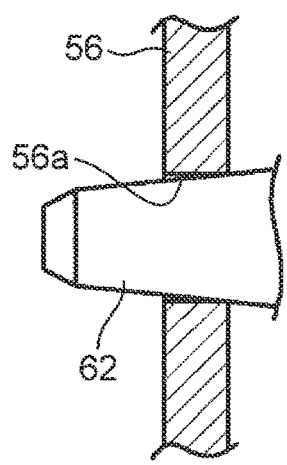
FIG. 11 is an enlarged cross-sectional view of a fitting portion between a second support shaft and a shaft hole of the lock tooth of the slide device in FIG. 10.

Disclosed in Patent Literature 1 is, as illustrated in FIGS. 10 and 11, a tapered second support shaft 62 and a through hole 56a that are for connecting together a lock tooth 55 and an operating lever 56. It seems that this structure cannot be employed in a fitting portion for a rotational shaft of a lock tooth 55 and a hole regarding a view point described below. The slide device 1 of the embodiment and the slide device disclosed in Patent Literature 1 will be described in comparison below.

As illustrated in FIGS. 10 and 11, in the slide device disclosed in Patent Literature 1, a tapered second support shaft 62 is provided on the lock tooth 55 for connecting together the lock tooth 55 and the operating lever 56. By fitting the tapered second support shaft 62 in the through hole (straight hole) 56a that is provided in a distal end portion of the operating lever 56 and straightly extending with a circular cross-section, rattling of the operating lever 56 is prevented. However, the tapered second support shaft 62 which is fit in the straight hole 56a merely contacts an edge of the opening of the straight hole 56a by a line-contact, which is greatly different from the face-to-face contact between the inner tapered face 7c of the lock tooth 7 and the outer tapered face 6b of the shaft 6 employed in the slide device 1 of the embodiment. Moreover, there is no press member (wave washer 8) for keeping the face-to-face contact as in the embodiment.

Thus, in the slide device disclosed in Patent Literature 1 illustrated in FIGS. 10 and 11, the contact area between the second support shaft 62 and the operating lever 56 is very small compared to the face-to-face contact structure of the embodiment, so that it is practically impossible to prevent rattling of the seat on which a large force proportional to the weight of the seat and the person (80 N or greater) acts in the front-and-rear direction as in the slide device 1 of the embodiment. That is, applying the fitting portion for the tapered second support shaft 62 and the through hole 56*a* to the fitting portion for the rotational shaft (first support shaft 57) of the lock tooth 55 and the hole cannot achieve the object of eliminating rattling. Thus, such application seems practically impossible.

Furthermore, in the slide device disclosed in Patent Literature 1 as illustrated in FIG. 10, the distance between the second support shaft 62, which is the pivot center of the operating lever 56, and a free end of the operating lever 56 (corresponding to the left end of the operating lever 56 in FIG. 10, not shown), which is the point of effort, is usually set long (for example, 200 mm or longer). In this configuration, the resistance against motion (frictional resistance) at the pivot center is not a problem since the operating lever 56 can be swung by a small operating force. Thus, fitting between the straight hole 56*a* and the tapered second support shaft 62 as described above does not cause any problem in operation.

However, in the slide device 1 of the embodiment, as illustrated in FIG. 6, the distance between the shaft 6, which is the pivot center of the lock tooth 7, and the distal end of the receiving portion 7*d*, which is the point of effort, is very short compared to the distance between the pivot center of the operating lever 56 and the point of effort, so that a large operating force needs to be given to the receiving portion 7*d* to swing the lock tooth 7. If the resistance against motion (frictional resistance) at the shaft 6, which is the pivot point, is large when a large operating force is given to the receiving portion 7*d*, there is a problem in operability to swing the lock tooth 7.

To avoid such a problem, the slide device 1 of the embodiment employs the structure in which the inner tapered face 7*c* of the lock tooth 7 and the outer tapered face 6*b* of the shaft 6 make face-to-face contact with each other as described above.

(Exemplary Modification)

(A) In the embodiment, a plurality of engaging holes 2*a* is employed as the engaged-part of the lower rail 2 and the teeth 7*a* of the lock tooth 7 are employed as the engaging-part of the engaging member to engage with the engaged-part. However, the present invention is not limited to such a configuration. In the present invention, the engaged-part and the engaging-part may employ any engageable structure. For example, a plurality of projections may be employed as the engaged-parts of the lower rail 2 and a plate having a receiving hole in which the projection can fit (for example, the engagement piece 58 having the catch hole 59 as illustrated in FIG. 10) or a plurality of teeth or projections that can mesh with the projections of the lower rail 2 may be employed in the lock tooth 7 as the engaging-part.

(B) In the embodiment, the shaft 6 is attached to the upper rail 3 via the holder 9. However, the present invention is not limited to such a configuration. The shaft 6 may directly be attached to the upper rail 3.

(C) In the embodiment, the wave washer 8 is described as an example of the press member. However, the present invention is not limited to such a configuration. Any part that functions to press the lock tooth 7 in the axial direction of the shaft 6 (width direction Y in FIG. 5) from the distal end portion 6*a* toward the deeper side (toward the proximal end portion 6*d*) of the shaft 6 may be employed as the press member of the present invention. For example, a spring washer, a compressive coil spring, or a ring made of an elastic material such as rubber and resin may be employed as the press member of the present invention.

(D) In the embodiment, an example in which the slide device 1 allows the seat S for a car to slide and locks the seat S at a desired position is described. However, the present invention is not limited to such a configuration. The slide device of the present invention may be used for locking a seat used in other fields. For example, the slide device of the present invention may be employed to lock the position of a seat for vehicles other than cars, such as ships and airplanes, or a seat set in facilities, such as game arcades The present invention described above is summarized as below based on the described embodiment.

A slide device according to the present invention is a slide device that slidably supports a seat along a front-and-rear direction and locks the seat at a desired position regarding the front-and-rear direction, the slide device including a lower rail fixed to an installation face where the seat is set, an upper rail that has a portion fixed to the seat and is guided by the lower rail to move along the front-and-rear direction, and a lock mechanism for locking the upper rail to the lower rail, in which the lower rail includes a plurality of engaged-parts provided along a longitudinal direction of the lower rail, the lock mechanism includes a shaft attached to the upper rail and extending in a width direction of the seat perpendicular to the front-and-rear direction, an engaging member that includes an engaging-part having a shape engageable with at least one of the plurality of engaged-parts of the lower rail, and a shaft hole to which the shaft is inserted, and is supported by the shaft so as to pivot about the shaft, and a press member that presses the engaging member in an axial direction of the shaft, an outer circumferential face of the shaft has an outer tapered face slanted so that the shaft becomes thinner along a direction from a proximal end portion toward a distal end portion, an inner circumferential face of the shaft hole of the engaging member has an inner tapered face having a slant angle that allows face-to-face contact with the outer tapered face, and the press member presses the engaging member in a direction in which the inner tapered face is pressed against the outer tapered face to make face-to-face contact.

According to the configuration, the lock mechanism for locking the upper rail to the lower rail includes the shaft, the engaging member, and the press member. The outer circumferential face of the shaft has the outer tapered face slanted so that the shaft becomes thinner along the direction from the proximal end portion toward the distal end portion. The inner circumferential face of the shaft hole of the engaging member has an inner tapered face having a slant angle that allows face-to-face contact with the outer tapered face. The press member presses the engaging member in the axial direction of the shaft, more specifically, presses the engaging member in a direction in which the inner tapered face is pressed against the outer tapered face to make face-to-face contact. In this configuration, the face-to-face contact between the inner tapered face of the shaft hole of the engaging member and the outer tapered face of the shaft is kept by the pressing force given from the press member to the engaging member in the locked state in which the lock mechanism restricts the movement of the upper rail relative to the lower rail, so that the engaging member can eliminate rattling along the axial direction of the shaft and the front-and-rear direction of the seat. As a result, the slide device can prevent rattling of the seat with a simple structure.

It is preferable that the lock mechanism further includes a holder that interconnects the shaft and the upper rail to fix the shaft to the upper rail.

According to this configuration, the shaft is fixed to the upper rail via the holder, so that the shaft can easily be fixed to an arbitrary position on the upper rail and the workability of attaching the shaft improves.

It is preferable that the holder includes a pair of opposing walls separated from each other along the width direction, the shaft is fixed to each of a pair of opposing walls so that the outer tapered face is positioned between a pair of opposing walls, and the engaging member is swingably supported between a pair of opposing walls by the shaft with the outer tapered face and the inner tapered face in face-to-face contact with each other.

According to this configuration, the shaft is fixed to each of a pair of opposing walls of the holder, so that the shaft can stably be fixed to the holder. Moreover, the engaging member is swingably supported between a pair of opposing walls of the holder by the shaft, which reliably avoids the engaging member coming off the shaft even in a state that the outer tapered face and the inner tapered face are in face-to-face contact with each other. Furthermore, in this configuration, a pair of opposing walls of the holder can reliably protect the contact portions of the outer tapered face and the inner tapered face from depositing of or contacting foreign objects, and thus deterioration in the tapered faces can be suppressed.

The press member is preferably an annular member surrounding the entire circumference of the shaft.

According to this configuration in which the press member is made of an annular member surrounding the entire circumference of the shaft, such as a wave washer, the press member will not come off the shaft when the shaft is inserted in the press member. Moreover, the press member can press the engaging member in the axial direction evenly along the entire outer circumference of the shaft.

In particular, in a structure in which the engaging member is swingably supported between a pair of opposing walls of the holder by the shaft, the press member can further reliably press the engaging member in the axial direction without coming off the shaft by disposing the press member made of an annular member between a pair of opposing walls to be sandwiched between the opposing wall to which the distal end portion of the shaft is fixed and the engaging member.

It is preferable that the lock mechanism further includes a rotationally urging member that gives a rotationally urging force to the engaging member in such a direction that causes the engaging-part to engage with the engaged-part.

According to this configuration, the rotationally urging member gives the engaging member the rotationally urging force in such a direction that causes the engaging-part to engage with the engaged-part, so that the rotationally urging member prevents the engaging-part of the engaging member from disengaging from the engaged-part of the lower rail by, for example, vibration transferred from the installation face to the slide device at a timing unexpected by a user.

It is preferable that the engaging member includes a receiving portion that is provided in an opposite side of a portion where the engaging-part is provided, in relation to the shaft hole, and receives an operating force to swing the engaging member in such a direction that causes the engaging-part to disengage from the engaged-part, and the slide device further includes an operating lever that is swingably supported on the upper rail and externally gives an operating force to the receiving portion.

According to this configuration, the operating force can be given to the receiving portion of the engaging member via the operating lever, and an operation for swinging the engaging member in such a direction that causes the engaging-part to disengage from the engaged-part can be made easily and reliably.

As described above, the slide device of the embodiment can prevent rattling of the seat with a simple structure.

The invention claimed is:

1. A slide device that slidably supports a seat along a front-and-rear direction and locks the seat at a desired position in the front-and-rear direction, the slide device comprising:
   a lower rail fixed to an installation face where the seat is set;
   an upper rail that has a portion fixed to the seat and is guided by the lower rail to move along the front-and-rear direction; and
   a lock mechanism for locking the upper rail to the lower rail,
   wherein the lower rail includes a plurality of engaged-parts provided along a longitudinal direction of the lower rail,
   the lock mechanism includes
      a shaft attached to the upper rail and extending in a width direction of the seat perpendicular to the front-and-rear direction,
      an engaging member that includes an engaging-part and a shaft hole, wherein the engaging-part has a shape engageable with at least one of the plurality of engaged-parts of the lower rail, and the shaft is inserted into the shaft hole, and
      a press member that presses the engaging member in an axial direction of the shaft,
      an outer circumferential face of the shaft has an outer tapered face slanted so that the shaft becomes thinner along a direction from a proximal end portion toward a distal end portion,
      an inner circumferential face of the shaft hole of the engaging member has an inner tapered face having a slant angle that allows face-to-face contact with the outer tapered face,
      the engaging member is supported by the shaft so as to pivot about the shaft, and
      the press member presses the engaging member in a direction in which the inner tapered face is pressed against the outer tapered face to make face-to-face contact.

2. The slide device according to claim 1, wherein the lock mechanism further includes a holder that interconnects the shaft and the upper rail to fix the shaft to the upper rail.

3. The slide device according to claim 2, wherein
   the holder includes a pair of opposing walls separated from each other along the width direction,
   the shaft is fixed to each of the pair of opposing walls so that the outer tapered face is positioned between the pair of opposing walls, and
   the engaging member is swingably supported between the pair of opposing walls by the shaft with the outer tapered face and the inner tapered face in face-to-face contact with each other.

4. The slide device according to claim 1, wherein the press member is an annular member surrounding an entire circumference of the shaft.

5. The slide device according to claim 1, wherein the lock mechanism further includes a rotationally urging member that gives a rotationally urging force to the engaging member in such a direction that causes the engaging-part to engage with the at least one of the plurality of engaged-parts.

6. The slide device according to claim 1, wherein
   the engaging member includes a receiving portion, wherein the receiving portion is provided in an opposite side of a portion where the engaging-part is provided, in relation to the shaft hole, and wherein the receiving portion is configured to receive an operating force to swing the engaging member in such a direction that causes the engaging-part to disengage from the at least one of the plurality of engaged-parts, and the slide device further includes an operating lever that is swingably supported on the upper rail and is configured to externally give the operating force to the receiving portion.

7. The slide device according to claim 2, wherein the press member is an annular member surrounding an entire circumference of the shaft.

8. The slide device according to claim 3, wherein the press member is an annular member surrounding an entire circumference of the shaft.

9. The slide device according to claim 2, wherein the lock mechanism further includes a rotationally urging member that gives a rotationally urging force to the engaging member in such a direction that causes the engaging-part to engage with the at least one of the plurality of engaged-parts.

10. The slide device according to claim 3, wherein the lock mechanism further includes a rotationally urging member that gives a rotationally urging force to the engaging member in such a direction that causes the engaging-part to engage with the at least one of the plurality of engaged-parts.

11. The slide device according to claim 4, wherein the lock mechanism further includes a rotationally urging member that gives a rotationally urging force to the engaging member in such a direction that causes the engaging-part to engage with the at least one of the plurality of engaged-parts.

12. The slide device according to claim 7, wherein the lock mechanism further includes a rotationally urging member that gives a rotationally urging force to the engaging member in such a direction that causes the engaging-part to engage with the at least one of the plurality of engaged-parts.

13. The slide device according to claim 8, wherein the lock mechanism further includes a rotationally urging member that gives a rotationally urging force to the engaging member in such a direction that causes the engaging-part to engage with the at least one of the plurality of engaged-parts.

14. The slide device according to claim 2, wherein the engaging member includes a receiving portion, wherein the receiving portion is provided in an opposite side of a portion where the engaging-part is provided, in relation to the shaft hole, and wherein the receiving portion is configured to receive an operating force to swing the engaging member in such a direction that causes the engaging-part to disengage from the at least one of the plurality of engaged-parts, and the slide device further includes an operating lever that is swingably supported on the upper rail and is configured to externally give the operating force to the receiving portion.

15. The slide device according to claim 3, wherein the engaging member includes a receiving portion, wherein the receiving portion is provided in an opposite side of a portion where the engaging-part is provided, in relation to the shaft hole, and wherein the receiving portion is configured to receive an operating force to swing the engaging member in such a direction that causes the engaging-part to disengage from the at least one of the plurality of engaged-parts, and the slide device further includes an operating lever that is swingably supported on the upper rail and is configured to externally give the operating force to the receiving portion.

16. The slide device according to claim 4, wherein the engaging member includes a receiving portion, wherein the receiving portion is provided in an opposite side of a portion where the engaging-part is provided, in relation to the shaft hole, and wherein the receiving portion is configured to receive an operating force to swing the engaging member in such a direction that causes the engaging-part to disengage from the at least one of the plurality of engaged-parts, and the slide device further includes an operating lever that is swingably supported on the upper rail and is configured to externally give the operating force to the receiving portion.

17. The slide device according to claim 5, wherein the engaging member includes a receiving portion, wherein the receiving portion is provided in an opposite side of a portion where the engaging-part is provided, in relation to the shaft hole, and wherein the receiving portion is configured to receive an operating force to swing the engaging member in such a direction that causes the engaging-part to disengage from the at least one of the plurality of engaged-parts, and the slide device further includes an operating lever that is swingably supported on the upper rail and is configured to externally give the operating force to the receiving portion.

18. The slide device according to claim 7, wherein the engaging member includes a receiving portion, wherein the receiving portion is provided in an opposite side of a portion where the engaging-part is provided, in relation to the shaft hole, and wherein the receiving portion is configured to receive an operating force to swing the engaging member in such a direction that causes the engaging-part to disengage from the at least one of the plurality of engaged-parts, and the slide device further includes an operating lever that is swingably supported on the upper rail and is configured to externally give the operating force to the receiving portion.

19. The slide device according to claim 8, wherein the engaging member includes a receiving portion, wherein the receiving portion is provided in an opposite side of a portion where the engaging-part is provided, in relation to the shaft hole, and wherein the receiving portion is configured to receive an operating force to swing the engaging member in such a direction that causes the engaging-part to disengage from the at least one of the plurality of engaged-parts, and the slide device further includes an operating lever that is swingably supported on the upper rail and is configured to externally give the operating force to the receiving portion.

* * * * *